United States Patent

Pool

[15] 3,703,783
[45] Nov. 28, 1972

[54] TROT LINE CASTER
[72] Inventor: Samuel T. Pool, P.O. Box 2014, Pascagoula, Miss. 39567
[22] Filed: June 3, 1971
[21] Appl. No.: 149,724

[52] U.S. Cl. ..................43/54.5 A, 43/27.4, 43/43.11
[51] Int. Cl. .........................A01k 97/06, A01k 91/02
[58] Field of Search......43/54.5 A, 54.5, 27.4, 4, 4.5, 43/19, 41.2, 43.11

[56] References Cited

UNITED STATES PATENTS 2,041,322  5/1936  Cantini......................43/43.11
3,060,622  10/1962  Lowry......................43/54.5 A
3,466,785  9/1969  Shook........................43/27.4

*Primary Examiner*—Warner H. Camp
*Attorney*—Edward Brosler

[57] ABSTRACT

A caster for a fishing line carrying a plurality of spaced baited hooks, comprising a guide weight to which a pair of concentric shells are at one end connected, with the other end of said concentric shells left open to provide an accessible inner chamber for baited hooks and an accessible surrounding chamber for storage of line to which the hooks are connected, said concentric shells having at least one slot running longitudinally from the open end of each toward the guide weight.

10 Claims, 10 Drawing Figures

PATENTED NOV 28 1972

SAMUEL T. POOL
INVENTOR.

BY Edward Brosler
ATTORNEY

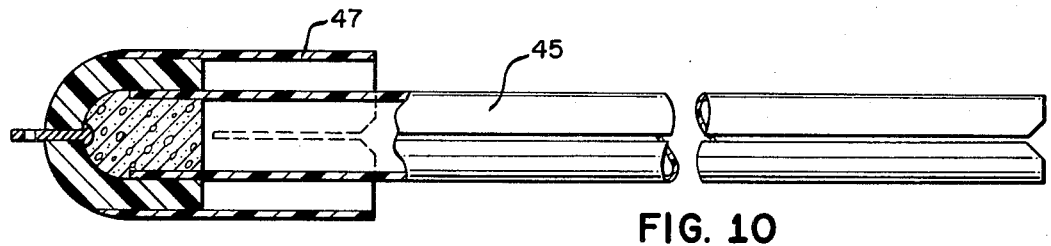
FIG. 10
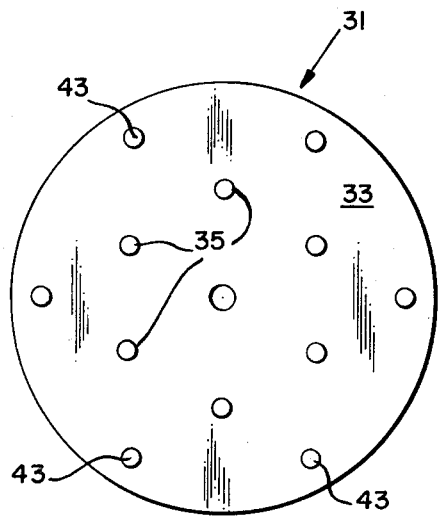
FIG. 6
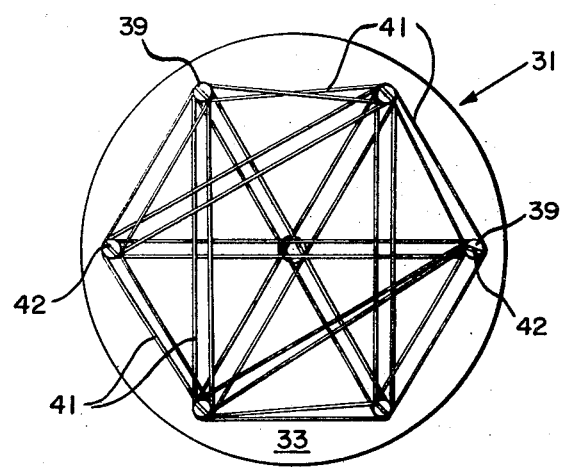
FIG. 7
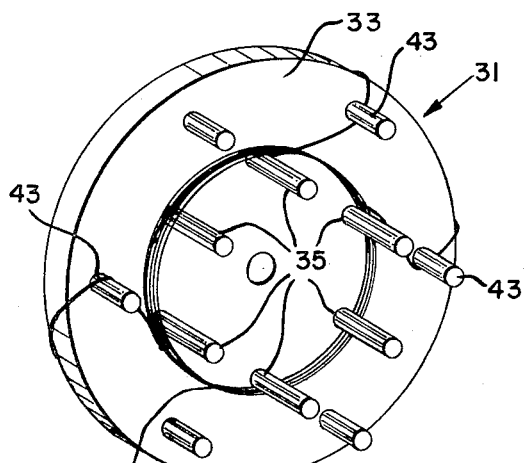
FIG. 8
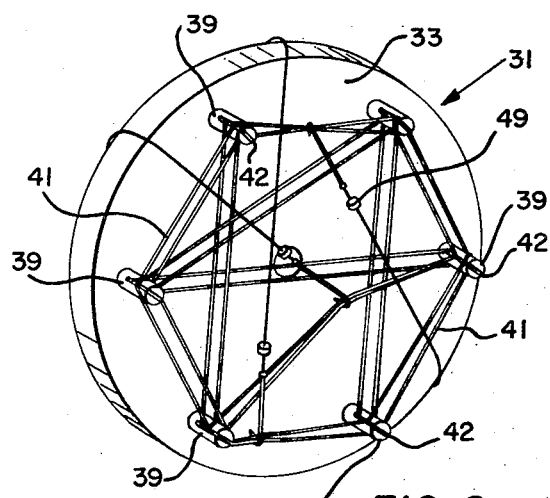
FIG. 9
SAMUEL T. POOL
INVENTOR.
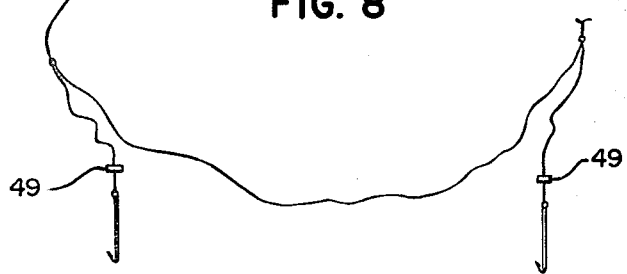
BY
Edward Brosler
ATTORNEY

TROT LINE CASTER

The invention relates to fishing tackle and more particularly to apparatus for casting a trot line or similar line having a plurality of baited hooks attached thereto at spaced intervals.

Previously, when a fisherman desired to cast a line having a plurality of spaced baited hooks attached thereto, he would tie a rock or some suitable weight to his line and throw it, but seldom with any degree of success, for there always existed the real danger of hooking himself in the process, or one or more of the hooks would invariably tangle on some object on shore such as a bush, a log or rock, which obviously would foil his effort.

As another approach, the fisherman might stretch his line with the baited hooks along the bank paralleling the water, and starting at one end, attempt to toss three or four of the baited hooks at a time into the water as he walks along the length of the stretched line. This approach is wholly unsatisfactory, as his distance of cast is limited by those portions of the line remaining on the ground waiting to be cast. This latter approach may require many attempts before the fisherman is even half satisfied with the results of his attempts to launch his line.

Among the objects of the present invention are:

1. To provide a novel and improved means for casting a fishing line such as a trot line, having a plurality of baited hooks connected thereto at spaced intervals;

2. To provide a novel and improved trot line casting means enabling an individual to manually hurl such a line a substantial distance from shore;

3. To provide a novel and improved trot line casting means, and a reel assembly for loading such casting means in preparation for the casting of a line;

4. To provide a novel and improved trot line casting means which can unfurl a substantial length of line having many hooks connected there at spaced intervals;

5. To provide a novel and improved trot line casting means which will enable the successful casting of a trot line or similar line, a substantial distance and without danger of snagging oneself or some other object close by, in the process.

Additional objects of the invention will be brought out in the embodiment description of a preferred embodiment of the same taken in conjunction with the accompanying drawings, wherein FIG. 1 is a senic view depicting the use of the casting device of the present invention;

FIG. 6 is one side view in elevation of a storage reel assembly for use in loading the casting means of FIG. 2;

FIG. 7 is the opposite side view of the storage reel assembly of FIG. 6;

FIG. 8 is a three dimensional view of the storage reel assembly, depicting one side when in use;

FIG. 9 is a three dimensional view of the storage reel assembly, depicting the other side when in use; and FIG. 10 is a longitudinal view of a simplified casting means, usable where but a relatively few baited hooks are involved.

Figure 1:
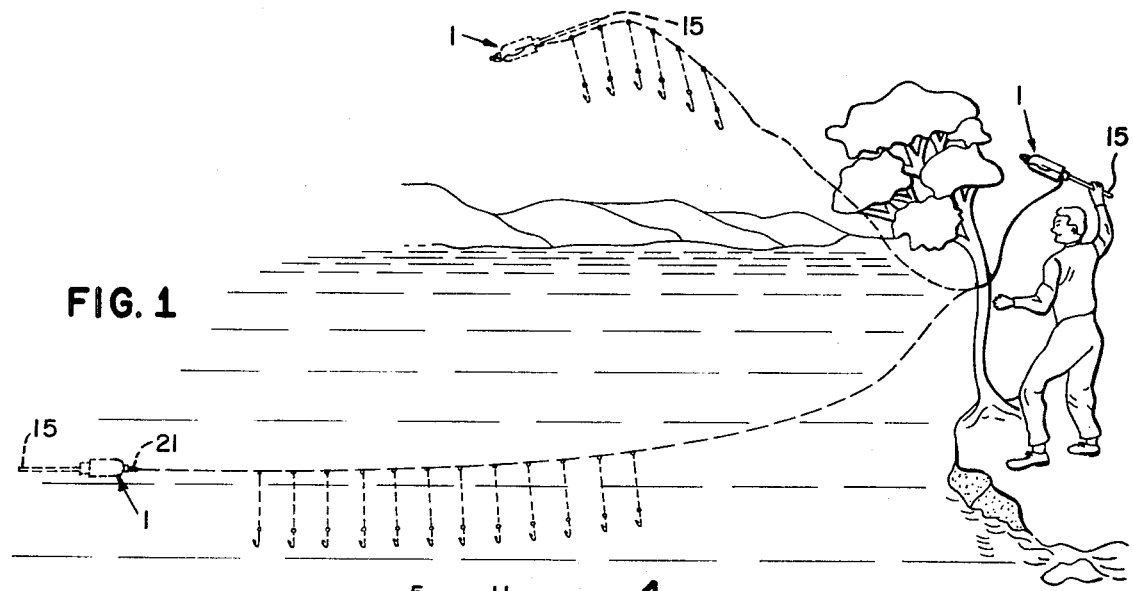
Figure 2:
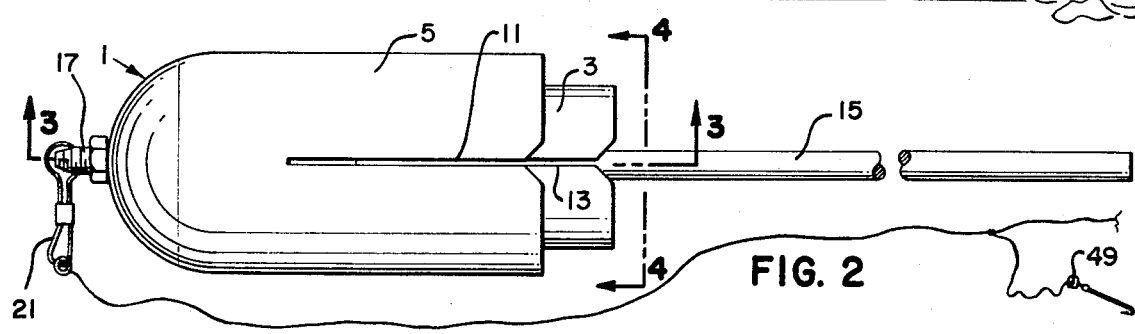
FIG. 2 is a side view in elevation of the casting device of the present invention.
Figure 3:
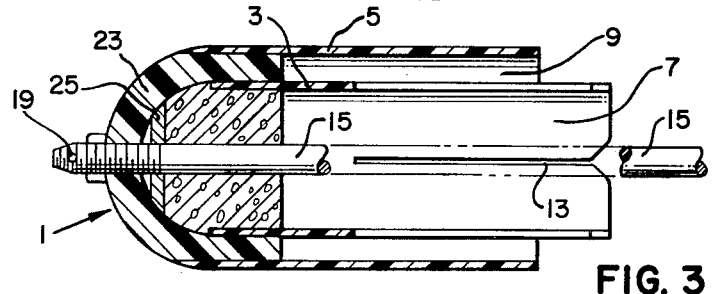
FIG. 3 is a fragmentary longitudinal view in section, taken in the plane 3—3 of FIG. 2.
Figure 4:
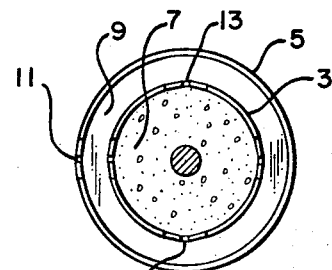
FIG. 4 is a view in section taken in the plane 4—4 of FIG. 2.
Figure 5:
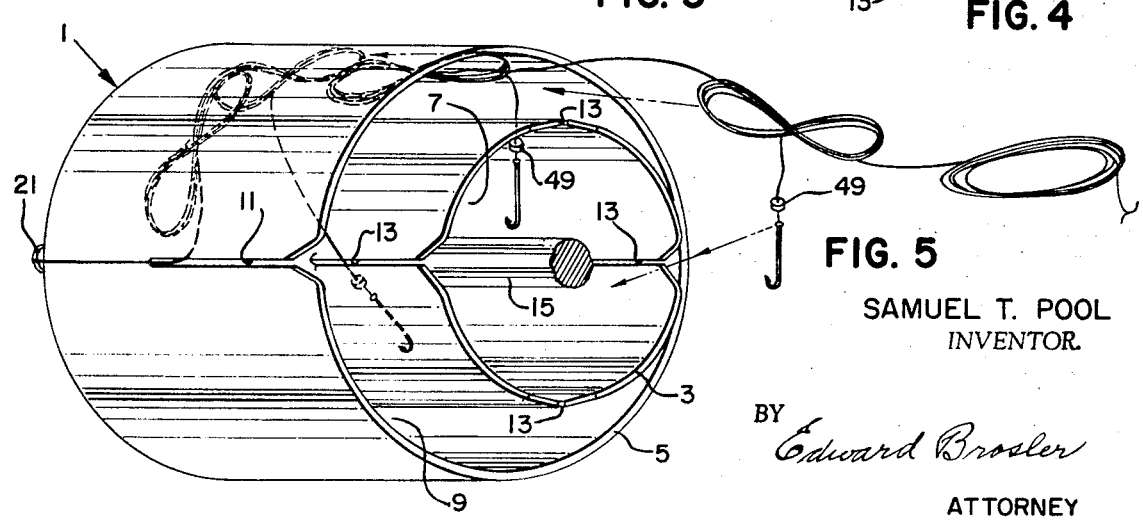
FIG. 5 is a three dimensional view of the device of FIG. 2, depicting the manner of loading the same.

Referring to the drawings for details of the invention in its preferred form, the caster of FIG. 2 comprises a guide weight 1 preferably tapered or hemi-spherical in shape. To the base end of this guide weight are attached a pair of concentric shells involving an inner shell 3 and an outer shell 5, the free ends of which shells are left open to form an inner compartment 7 and a surrounding outer compartment 9. The outer shell is provided with a longitudinal slot 11 from its open end and extending substantially to the guide weight, and the inner shell with at least one slot 13, through where a substantial number of baited hooks are involved, the inner shell will be provided with a plurality of preferably equally spaced slots 13.

Extending axially from the guide weight is a handle 15 in the form of a rod, for use in throwing the caster for substantial distances. The rod is preferably threaded through the guide weight or otherwise fixed therein with one end extending sufficiently to protrude slightly therefrom, the end 17 thus exposed, being provided with a transverse hole 19 to permit of attachment of a swivel 21 or other means for connecting the hook or baited end of a fishing line thereto.

While the guide weight may be of metal, the same may be of cement, weighted plastic, or the like, and the concentric shells may likewise be of metal, plastic, or other suitable material affixed to the guide weight in any appropriate manner.

In the form indicated, the weighted end comprises the cup shaped element 23, one preferably having concentric inner and outer cylindrical surfaces, the inner cylindrical shell fitting into and being secured to the inner cylindrical surface, while the outer cylindrical shell fits about and is secured to the outer surface of the cup shaped element.

This cup shaped element is provided with a threaded axial hole therethrough into which the handle rod is threadedly secured, with its proximate end protruding sufficiently to expose the transverse hole therethrough for attachment of the swivel.

With the components thus assembled, the cup shaped element is filled with cement or the like to add weight thereto, and if additional weight is deemed desirable, a lead washer 25 or the like may be slipped over the handle rod and permitted to drop into the cup, prior to filling the same with cement.

In loading the caster with a trot line in preparation for a throw, the line being tied to the swivel, is drawn relatively taut along the length of the caster and threaded through the slot in the outer shell. At this stage, the line is pushed to the bottom of the outer chamber with a wooden paddle or similar tool while maintaining tension on the line. This will leave the line entering the outer chamber at the deep end of the slot.

With one hand held near the entrance to the outer chamber, the proximate exposed portion of the line is then wrapped about, say four fingers of the hand, until a leader approaches the hand, at which time the line is then removed from the hand, given a twist to form a figure eight, and in this condition, is pushed down toward the bottom of the outer chamber with the leader following. In the process, the baited hook only is slipped into the inner chamber with the leader extending through and sliding down the proximate notch of the inner shell.

This operation is then repeated, with each successive skein disposed clockwise with respect to the preceding one, until a circle of skeins has been achieved, following which, successive skeins are then disposed in counterclockwise position with respect to the preceding ones until a complete circle in this direction has been realized, when the direction is again reversed and the operations repeated until all the baited hooks of the trot line have been installed in the caster.

When the caster is thus loaded, it is ready for a cast, but prior to casting, the free end of the line should be anchored to a flexible branch or sturdy shrub.

In the course of flight, the line and baited hooks will be withdrawn from the caster in the reverse order in which they have been installed, the precise manner of loading the caster assuring that withdrawal of the baited hooks will be smooth and orderly, and with no opportunity for entanglements.

When the caster has reached the end of its flight as determined by the overall length of the line, the flexible anchoring of the line will serve to absorb the shock of sudden flight termination, and thus minimize the effect thereof on the baited hooks.

To facilitate the retrieval of the line and subsequent reloading of the caster, I have provided the storage reel assembly depicted in FIGS. 6–9 of the drawings, to which reference will now be made.

In its preferred form, this device involves a reel 31 formed of a circular disc 33 having on one side thereof, a plurality of posts or pegs 35 arranged in a circle about the center of the disc, and on which may be wrapped the line as it is retrieved.

From the other side of the disc, extend a plurality of posts 39, preferably also arranged on a circle about the center, and between these posts, are stretched a plurality of rubber bands 41 in any desired pattern, such rubber bands serving to provide flexible anchoring for the hooks of the trot line. Slits 42 in the ends of these posts may be provided to assure adequate spacing from the disc 33. Thus as one wraps the line about the first set of posts and comes to a leader and hook, the leader is brought over the edge of the disc, and with the leader under tension, one of the rubber bands is strained to bring it within reach of the hook and then released.

A more secure and effective anchorage may be realized by snubbing the leader prior to engaging the hook over one of the bands, and such snubbing is made possible by the installation of a plurality of posts or pegs 43 in proximity to the edge of the disc and on the side opposite that on which the rubber bands are mounted. In fact, in the interest of economy and simplicity of construction, these snub posts 43 and the rubber band supporting posts 39 may be integral.

Thus the entire trout line may be stored on this reel until one is ready to bait the hooks and load the caster, and with the aid of the storage reel, the loading of the caster becomes a relatively simple and orderly procedure.

The above described caster and storage reel are primarily for use in a trot line employing a substantial number of hooks at spaced intervals along the line, such number being of the order of 20, 30 or more hooks.

However, where one wants to employ but a few hooks such as three or four at spaced intervals along the line, a storage reel is not essential and the structure of the caster may be somewhat simplified. In this embodiment, as depicted in FIG. 10 of the drawings, an inner shell 45 extends outwardly beyond the rim of the outer shell 47, and as such, may be used also as the handle for the caster, thus eliminating the necessity for installing the rod type handle of the embodiment of FIG. 2. Because there are so few hooks, only one notch is provided in the inner shell. Because of the absence of the rod type handle, the swivel is attached directly to the weighted end of the caster.

Inasmuch as the small number of baited hooks to be employed with the caster of FIG. 10, will occupy but a small portion of the overall length of the line, this caster may be employed with the conventional fishing rod and reel. However, to assure that the baited hooks will be withdrawn from the caster while the caster is in flight, the fishing reel should offer sufficient resistance to unwinding, to over balance any resistance involved in withdrawing the baited hooks from the caster while in flight. Inasmuch as such latter resistance will be very slight, very little braking action will be required at the reel to assure such withdrawal of the baited hooks.

In either of the foregoing embodiments of the invention, should one experience any snagging of the tied end of the hook in a slot of the inner shell during a cast, such problem can be avoided by installing a small washer 49 on the leader adjacent the hook, and making certain that such washer bears against the inner surface of the inner shell when installing the baited hooks therein.

The casters described above have worked very well in practice when employing hooks baited with worms or certain types of artificial bait. When employing bait such as liver or the like, the tendency for such bait to adhere to the surface of the inner shell wherever it contacts such shell, has been solved by greasing the inner surface of the shell to discourage such sticking.

From the foregoing description of my invention, it will be apparent that the same is subject to alteration and modification without departing from the underlying principles involved, and I accordingly do not desire to be limited in my protection to the specific details illustrated and described, except as may be necessitated by the appended claims.

I claim:

1. A trot line caster comprising a guide weight, a pair of substantially concentric shells each connected at one end to said weight, and with the remaining end open, to form an inner compartment for receiving baited hooks and a surrounding compartment for storage of a line to which such baited hooks are connected at spaced intervals, each of said shells having at least one longitudinal slot from its open end to substantially said guide weight, means on said caster for attachment of a line having multiple hooks connected thereto and means at said open end of said caster, for grasping said caster to hurl the same a substantial distance.

2. A trot line caster in accordance with claim 1, characterized by the inner of said concentric shells having a plurality of such longitudinal slots substantially equally spaced about the circumference thereof.

3. A trot line caster in accordance with claim 1, characterized by said means for grasping and hurling said caster including a handle extending from the open end thereof.

4. A trot line caster in accordance with claims 3, characterized by said handle including a rod running longitudinally of said concentric shells and connecting to said guide weight.

5. A trot line caster in accordance with claim 3, characterized by said handle comprising an extension of the inner of said concentric shells.

6. A trot line caster in accordance with claim 3, characterized by said concentric shells being of thin plastic material.

7. A trot line caster in accordance with claim 1, and a reel assembly for storing the baited portion of said line in preparation for loading said caster.

8. A trot line caster and reel assembly in accordance with claim 7, characterized by said reel assembly including a reel about which the baited portion of said line may be wound, means on a side of said reel for supporting at least one elastic band under tension over which to engage a hook, and means along a rim of said reel for snubbing the leader associated with said hook prior to engaging said hook over said elastic band.

9. A reel assembly for storing a trot line in condition for loading a trot line caster comprising a reel about which the baited portion of such trot line may be wound, means on a side of said reel for supporting at least one elastic band under tension, over which to engage a hook, and means for snubbing a leader associated with said hook prior to engaging said hook over said elastic band.

10. A reel assembly in accordance with claim 9, characterized by said means for supporting at least one elastic band on a side of said reel, including a plurality of posts at spaced intervals on one side of said reel, whereby an elastic band stretched between posts above said side of the reel, can serve to anchor such hooks.

* * * * *